(12) United States Patent
Menary et al.

(10) Patent No.: US 8,852,497 B2
(45) Date of Patent: Oct. 7, 2014

(54) METHOD AND APPARATUS FOR PROVIDING AN INTERNAL SURFACE TEMPERATURE PROFILE OF A THERMOPLASTIC PREFORM DURING A STRETCH BLOW MOULDING PROCESS

(75) Inventors: Gary Menary, Belfast (GB); Cecil Armstrong, Belfast (GB); Yannis Mugurel Salomeia, Belfast (GB)

(73) Assignee: The Queen's University of Belfast, Belfast (GB)

( * ) Notice: Subject to any disclaimer, the term of this patent is extended or adjusted under 35 U.S.C. 154(b) by 553 days.

(21) Appl. No.: 12/921,070

(22) PCT Filed: Mar. 4, 2009

(86) PCT No.: PCT/GB2009/050213
§ 371 (c)(1),
(2), (4) Date: Nov. 30, 2010

(87) PCT Pub. No.: WO2009/109777
PCT Pub. Date: Sep. 11, 2009

(65) Prior Publication Data
US 2011/0062611 A1     Mar. 17, 2011

(30) Foreign Application Priority Data

Mar. 7, 2008 (GB) .................... 0804266.5

(51) Int. Cl.
*B29C 49/78* (2006.01)
*B29C 49/64* (2006.01)
*B29C 35/08* (2006.01)
*B29B 11/08* (2006.01)
*B29C 49/12* (2006.01)
*B29C 49/42* (2006.01)
*B29K 67/00* (2006.01)
*B29C 49/16* (2006.01)
*B29C 49/06* (2006.01)
*B29K 23/00* (2006.01)
*B29B 11/14* (2006.01)

(52) U.S. Cl.
CPC ......... B29C 49/78 (2013.01); *B29C 2035/0822* (2013.01); *B29B 11/08* (2013.01); *B29C 49/12* (2013.01); *B29B 2911/14333* (2013.01); *B29C 49/4205* (2013.01); *B29K 2067/00* (2013.01); B29C 49/6445 (2013.01); *B29C 49/16* (2013.01); *B29B 2911/14713* (2013.01); *B29C 49/06* (2013.01); *B29B 2911/14466* (2013.01); *B29B 2911/1498* (2013.01); *B29K 2023/12* (2013.01); *B29K 2067/046* (2013.01); *B29B 2911/14326* (2013.01); *B29B 2911/1444* (2013.01); *B29B 11/14* (2013.01)
USPC ........... 264/521; 264/520; 425/529; 425/534; 425/526

(58) Field of Classification Search
USPC .......... 264/520, 521, 523, 535; 425/529, 534, 425/526
See application file for complete search history.

(56) References Cited

U.S. PATENT DOCUMENTS

| | | | | |
|---|---|---|---|---|
| 3,579,621 A * | 5/1971 | Mehnert | ........................ | 264/542 |
| 3,632,713 A * | 1/1972 | Seefluth | ........................ | 264/520 |
| 3,865,912 A | 2/1975 | Rosenkranz et al. | | |
| 4,317,793 A * | 3/1982 | Hubert et al. | .................. | 264/521 |
| 4,929,450 A * | 5/1990 | Takakusaki et al. | .......... | 425/526 |
| 5,032,700 A * | 7/1991 | Sugiyama et al. | ............ | 219/601 |
| 5,206,039 A * | 4/1993 | Valyi | .............................. | 425/526 |
| 5,869,110 A * | 2/1999 | Ogihara | ........................ | 425/526 |
| 6,099,766 A * | 8/2000 | Aoki et al. | ...................... | 264/39 |
| 6,176,699 B1 * | 1/2001 | Franjo et al. | .................. | 425/528 |
| 6,344,166 B1 * | 2/2002 | Aoki et al. | ..................... | 264/521 |
| 6,432,351 B1 * | 8/2002 | Ogihara | ........................ | 264/532 |
| 7,491,358 B2 * | 2/2009 | Gernhuber et al. | ........... | 264/454 |
| 2011/0291332 A1 * | 12/2011 | Voth et al. | ...................... | 264/532 |
| 2011/0294086 A1 * | 12/2011 | Voth et al. | ....................... | 432/49 |
| 2013/0052295 A1 * | 2/2013 | Schoenberger et al. | ...... | 425/526 |

FOREIGN PATENT DOCUMENTS

| | | | |
|---|---|---|---|
| AT | 521 U1 | 12/1995 | |
| EP | 1342550 A1 | 9/2003 | |
| WO | WO02/087850 A1 * | 11/2002 | .............. B29C 49/64 |
| WO | WO-02/087850 A1 | 11/2002 | |
| WO | WO-2005/067591 A2 | 7/2005 | |

OTHER PUBLICATIONS

Lorente Munoz, N., "International Search Report" for PCT/GB2009/050213 as mailed Jun. 12, 2009, 2 pages.

\* cited by examiner

*Primary Examiner* — Joseph S Del Sole
*Assistant Examiner* — Nahida Sultana
(74) *Attorney, Agent, or Firm* — Winstead PC

(57) ABSTRACT

A method for providing an internal surface temperature profile of a thermoplastic preform (10, 22) during a stretch blow molding production process comprising at least the steps of: (a) heating a plurality of in-line cold preforms (10) in the production process to provide a plurality of in-line heated preforms (22); (b) diverting at least one of the in-line heated preforms to provide at least one off-line heated preform (30); (c) providing the remaining the in-line heated preforms to one or more stretch blow molds (24) for forming the heated preforms into blow molded products (12); and (d) locating one or more temperature sensors (34, 36) inside the or each off-line heated preform (30) of step (b) to provide an inside surface temperature profile of said preform(s).

18 Claims, 5 Drawing Sheets

METHOD AND APPARATUS FOR PROVIDING AN INTERNAL SURFACE TEMPERATURE PROFILE OF A THERMOPLASTIC PREFORM DURING A STRETCH BLOW MOULDING PROCESS

The present invention relates to a method and apparatus for analysing a thermoplastic preform, particularly but not exclusively as part of a stretch blow moulding (SBM) production process.

Stretch blow moulding (SBM), often also termed injection stretch blow moulding, is a complex process, now extensively used in the production of many kinds of containers for beverages, food, industrial products and the like. The process generally comprises two main steps. In the first step, a plastic such as PET is moulded into a preform, often in an injection moulding process. This process is used to ensure accurate forming of the threaded portion of the container and to accurately control the thickness distribution along its length.

The second step is the stretch blow moulding process. In this process, the preform is heated, usually in an oven with one or more infrared lamps, generally to a temperature which is above the glass transition temperature (Tg) of the material, for example being between 80-110° C. for PET. The softened preform is then introduced into a mould, where it is stretched and blown. The stretch is carried out by a stretch rod, and can be assisted by an applied first pressure of approximately 5 to 7 bar (also known as 'pre-blow'). When the preform touches the inside of the mould wall, it "freezes" due to the heat exchange. A final applied pressure in the region of 40 bar (known as 'final blow') is then applied. This is used to ensure good forming of detailed parts of the moulded product, such as ribs on a bottle.

There are many critical process variables in the SBM process. One is the temperature of the preform after heating, which varies along the length and through the thickness. It is not possible to carry out quality assessment of each heated preform due to the speed of the SBM process. Typical production speeds for main production cycles are generally in the range 50,000-60,000 bottles/hour. Thus, in practice, the only quality control possible at these speeds is the monitoring of the temperature of one outside reference spot or location on the heated preforms as they pass into the blow moulds, to give a rough guide as to the overall consistency of the heated preforms. However, it is also known that the temperature distribution across the whole preform is a critical process variable which can have a significant impact on the most important physical properties of the final blown article.

WO 2005/067591 A2 describes a stretch blow moulding system that conditions preforms such that the temperature distribution within the cross-section of each preform is optimised prior to blow moulding operations. The system involves using at least one high-speed, snap-shot action thermal infrared temperature sensor to acquire at least one of an outside temperature measurement of moving preform and an inside surface temperature of a moving preform during its conveyance or transport. Thus, temperature measurements can be directly monitored during in-line transport of the preforms between a thermal conditional section and a blow moulding section.

As stated in WO 2005/067591 A2, the speed at which preforms are transported through existing state of the art machines requires temperature measurements to be made within "a couple of milliseconds" (page 3, lines 2-3). Thus, it is a feature of the invention of WO 2005/067591 A2 to use static high-speed snap-shot action sensors as opposed to pyrometers, and the preforms must come within the directed field of views of the high-speed snap-shot action sensors. WO 2205/067591 A2 states that an accurate temperature measurement using a pyrometer requires a field of view for a period of time ranging from "hundreds of milliseconds to seconds", and the rate of preform transport does not allow for accurate temperature measurement using a pyrometer.

It is still a desire to achieve temperature monitoring of individual preforms as the most accurate way of providing feedback to the heating of the preforms, (and to other parameters or process conditions such as the oven-moulding temperature, etc.), so as to optimize the overall blow moulding process, and to best account for variations in the process, including variation in the initial temperature of the preforms being supplied to the process, ambient temperature, and/or pre-blow and final blow temperature variations.

It is also a desire to more accurately analyse the temperature of individual preforms over more than one spot or average area, i.e. to provide a preform temperature profile that can more accurately determine small temperature variations, especially when the preform non-regular heated, or where the quality of preforms being supplied to the process could vary beyond desired or expected quality limitations.

One problem with WO 2005/067591 A2 is that the temperature measurements must be coordinated at the high speed (milliseconds) continuously, which requires rigorous equipment considering the speed and turnover of a normal SBM process. Moreover, high-speed snap-shot action temperature sensors are very expensive, and are not preferred in the art for use in industrial processes. Furthermore, the invention of WO 2005/067591 A2 can only obtain one internal snap-shot temperature measurement due to the open neck of a preform only being in line with the inside surface temperature monitor for a couple of milliseconds. Thus, it is not practically possible using WO 2005/067591 to obtain a proper internal temperature profile (i.e. a temperature analysis along a length or distance) of a heated preform in a SBM process. The accuracy of one internal temperature measurement taken over a couple of milliseconds of a very fast moving preform in a mechanical industrial production line from a static sensor based on a lens element is also questionable. A 'couple of milliseconds' still only equates to a production line speed of 30,000 bottles/hour, significantly less than most current production line speeds for SBM bottles.

According to one aspect of the present invention, there is provided a method for providing an internal surface temperature profile of a thermoplastic preform during a stretch blow moulding production process comprising at least the steps of:

(a) heating a plurality of in-line cold preforms in the production process to provide a plurality of in-line heated preforms;
(b) diverting at least one of the in-line heated preforms to provide at least one off-line heated preform;
(c) providing the remaining in-line heated preforms to one or more stretch blow moulds for forming the heated preforms into blow moulded products; and
(d) locating a temperature sensor inside the or each off-line heated preform of step (b) to provide at least one inside surface temperature profile of said preform(s).

In this way, an internal temperature profile within the preform, preferably being along a or the length of the preform, can be obtained. Moreover, a slower but more accurate temperature profile of the inside surface of the or each off-line heated preform can be determined without affecting the speed of the production process, which information can then be used for feedback and control to the production process.

In one embodiment to the present invention, the method further provides the step of:

(e) using the temperature profile of step (d) to indicate a temperature profile of at least one, preferably a number of, the plurality of in-line heated preforms.

Preforms can be made of a single material or a combination of many well known plastic materials, including but not limited to PET, PLA, PP, etc. They can have any shape not limited to being regular, with one or more neck and/or threaded portions. Many standard or usual cold preforms generally have a weight between 10-40 gm, and a length between 20-150 mm.

The method of the present invention in particular provides an ability to control of the heating of the cold preforms in step (a) based on at least the inside surface temperature profile of step (d). Heating of preforms can be provided by any apparatus, device, unit, assembly or combination of same, and generally comprises one or heaters and/or coolers. The present invention can comprise controlling the location of the one or more the heaters and/or coolers based on at least the inside surface temperature profile of step (d).

In one embodiment of the present invention, the heating in step (a) is provided by a plurality of infrared lamps located along one longitudinal side of the cold preforms. The heaters may be differently spaced transversely from the cold preforms.

The diverting of at least one of the in-line heated preforms in step (b) may involve any mechanism, device, apparatus, unit, assembly, etc, usually involving one or more the group comprising: arms, rods, grippers, switch mechanisms and rails. Such a mechanism, etc. may be operable manually, automatically, or both, and may be in-line or separate from the remainder of the stretch blow moulding process.

Step (d) of the present invention could also be provided by any mechanism, device, apparatus, unit, assembly, etc., being operable manually, automatically, or both, and which may be in-line or separate from the remainder of the stretch blow moulding process.

Step (d) generally comprises passing one or more temperature sensors into the off-line preform(s), passing the off-line preform(s) over one or more temperature sensors, or a combination of same.

In another embodiment of the present invention, the method further comprises the step of: at least one of rotating the off-line preform(s) in step (d), rotating the temperature sensor(s), or both.

In another embodiment, the method of the present invention further comprises; locating one or more outside temperature sensors along the outside of the off-line heated preform of step (b) to provide an outside surface temperature profile of the off-line preform(s). This could comprise passing the one or more outside temperature sensors along the outside of the off-line preform(s), passing the off-line preform(s) across the one or more outside temperature sensors, or a combination of same.

With rotation of the preform(s) and/or rotation of at least one outside temperature sensor, the outside temperature sensor(s) are able to provide an outside circumferential temperature profile, which could be combined with an inside circumferential temperature profile of the off-line preform(s). Thus, the present invention is able to provide either 1-, 2- or 3-dimensional temperature profiles of the off-line preform(s).

According to a second aspect of the present invention, there is provided a method of assessing the internal surface temperature profile of a plurality of preforms in a stretch blow moulding production process comprising at least the steps of:
(a) heating a plurality of in-line cold preforms in the production process to provide a plurality of in-line heated preforms;
(b) diverting at least one of the in-line heated preforms to provide at least one off-line heated preform;
(c) providing the remaining in-line heated preforms to one or more stretch blow moulds for forming the heated preforms into blow moulded products;
(d) locating one or more temperature sensors inside of the or each off-line heated preform of step (b) to provide an inside surface temperature profile of said preform(s); and
(e) using the inside surface temperature profile of step (d) to assess the inside surface temperature profile of at least some of the remaining in-line heated preforms of step (c).

According to a third aspect of the present invention, there is provided a stretch blow moulding production process comprising at least the steps of:
(a) heating a plurality of in-line cold preforms in the production process to provide a plurality of in-line heated preforms;
(b) diverting at least one of the in-line heated preforms to provide at least one off-line heated preform;
(c) providing the remaining in-line heated preforms to one or more stretch blow moulds for forming the heated preforms into blow moulded products;
(d) locating one or more temperature sensors inside the or each off-line heated preform of step (b) to provide an inside surface temperature profile of said preform(s), preferably to provide a quality control of the production process.

According to a fourth aspect of the present invention, there is provided apparatus for a stretch blow moulding production process at least comprising:
a heating station to heat a plurality of in-line cold preforms to provide a plurality of in-line heated preforms;
diverting means to divert at least one of the in-line heated preforms to provide at least one off-line heated preform;
one or more stretch blow moulds for receiving the remaining in-line preforms and forming the heated preforms into blow moulded products; and
one or more temperature sensors able to be located inside the or each off-line heated preform to provide an inside surface temperature profile of said preform(s).

The methods of the second and third aspects and the apparatus of the fourth aspect of the present invention may also comprise one or more of the embodiments as described herein. The present invention encompasses all combinations of various embodiments or aspects of the invention described herein. It is understood that any and all method and apparatus embodiments of the present invention may be taken in conjunction with any other embodiment being a method and/or apparatus embodiment to describe additional embodiments of the present invention. Furthermore, any elements of an embodiment may be combined with any and all other elements of any of the embodiments to describe additional embodiments.

Embodiments of the present invention will now be described by way of example only, and with reference to the accompanying drawings in which.

Figure 1:
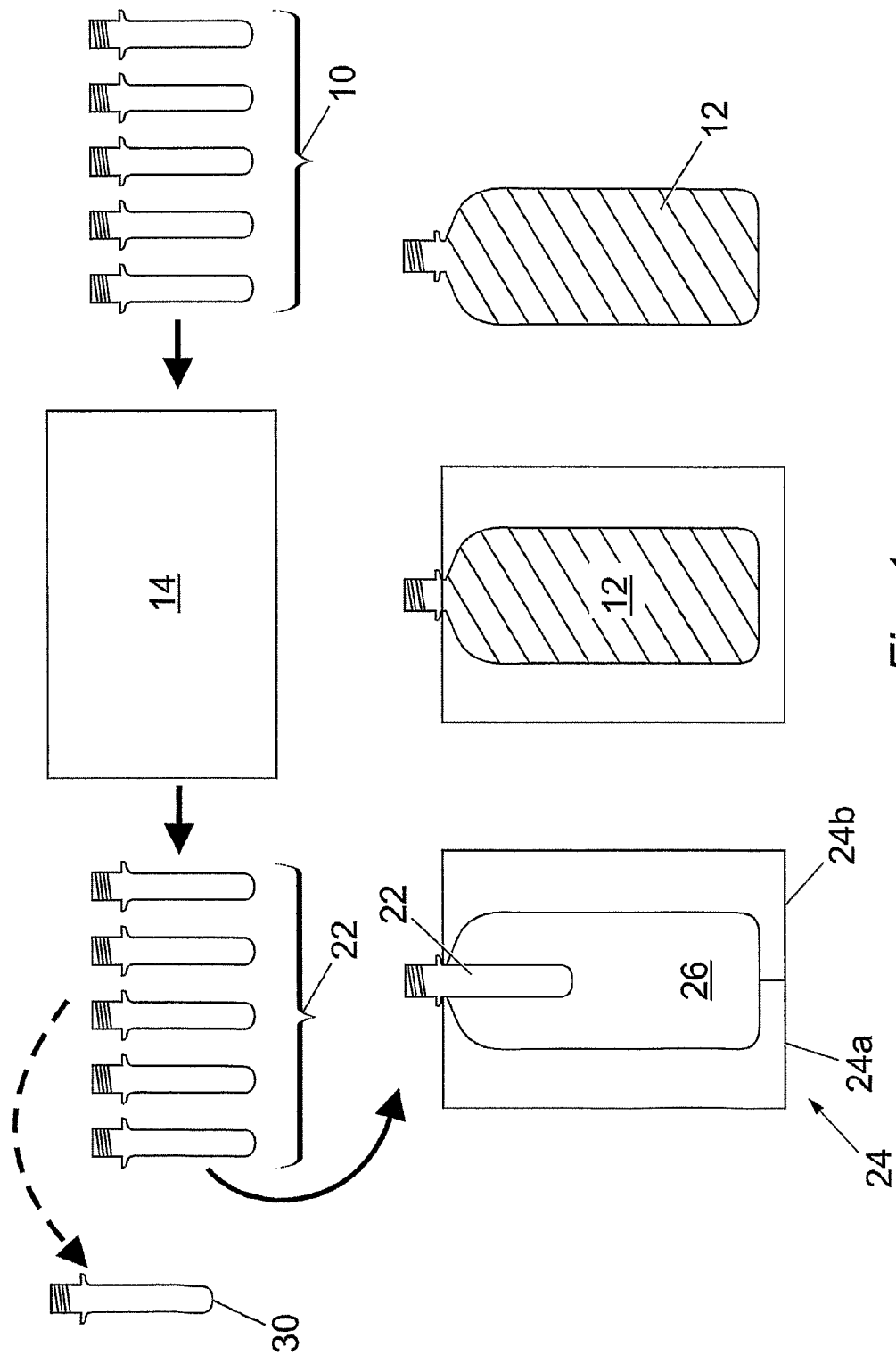
FIG. 1 is a stretch blow moulding production process according to one embodiment of the present invention.

Referring to the drawings, FIG. 1 shows a stretch blow moulding production process. Such processes generally run at non-stop production speeds of up to 60,000 bottles/hour. For the SBM process, a plurality of cold preforms (10) are provided for forming into blow moulded products (12), such as plastic bottles, containers and the like, which are major commercial worldwide products.

The form of the final blow moulded products (12) depends upon many process variables, the shape and thicknesses of the preforms, the temperature at each stage, pressures in the blow moulding steps, etc. One of the most important process variables is the temperature of the cold preform after its heating. Its temperature will determine the thickness and evenness of the final blow moulded products (12), and as such, is important for quality control.

FIG. 1 shows a number of preforms (10) provided for the SBM production process. The cold preforms (10) are commonly formed separately, and then provided to the SBM production process. Cold preforms can and do vary significantly in their shape, design, size, and external and internal dimensions, in particular their wall thicknesses at different points, which will then determine the majority of the characteristics of the final blow moulded products (12). As a typical example, a preform can have a weight between 20-40 gm, and a length between 20-150 mm, so as to provide an average longitudinal stretch ratio greater than 2, and a radial stretch ratio greater than 3. Such a preform could be used to form a 0.5-1 liter bottle between 150-250 mm tall. The features of cold preforms are known to the person skilled in the art, along with the expected final properties and dimensions of the blow moulded products therefrom.

Where the cold preforms have absolutely no variation in their shape, design, size etc, for a large or major production run, and there are no variations in the pressures and temperatures applied to the preforms during the SBM process, and there is no variation in the machinery used in the process, then the skilled person can be expectant of achieving consistency of the blow moulded products.

However, there can be many factors which vary any one of the process parameters. Many bottles have a non-uniform shape, which may be provided by a non-uniform shaped preform or non-uniform heating of the preform such as to provide a non-uniform circumferential temperature profile. Another common factor is a change in ambient conditions, such as ambient temperature. A rise of, for example, +5° C. in ambient conditions can significantly affect the change in temperature of a hot preform between its heating station and it subsequently reaching a mould.

Thus, the conventional practice of carrying out quality assessment of heated preforms based only on the monitoring of one outside reference and randomly positioned spot or location on a fast moving heated preform is no longer sufficient in use for at least two reasons. Firstly, a consistent temperature for one outside reference spot may not equate to a consistent temperature profile across other parts of the heated preforms, especially inside surface temperature. Secondly, reliance on monitoring only one outside reference spot may still require significant trial and error by the skilled person to set up the correct heating regime of the cold preforms across and/or along their length.

Indeed, in commerce, changes in the designs of blow moulded products such as drinks bottles are being carried out more frequently than traditionally, such that commonly, an SBM process must be adapted to make differing blow moulded products relatively regularly. Achieving faster start-up times for more frequent product changes, and still achieving consistent production quality, is hard to achieve for short-cycle production runs.

In the embodiment of the present invention shown in FIG. 1, the cold preforms (10) can be provided in-line using any transport or conveying mechanism (not shown in FIG. 1 for clarity purposes). Suitable transport or conveying mechanisms are known in the art, and generally comprise the provision of conveyed items in a 'one-by-one' production line. However, the present invention is not limited thereto, and thus the term "in-line" as used herein relates to the provision of a plurality of cold preforms to a heating station (14), and subsequently therefrom, in any manner suitable for a production process, preferably in a continuous or at least semi-continuous production line manner.

Figure 2:
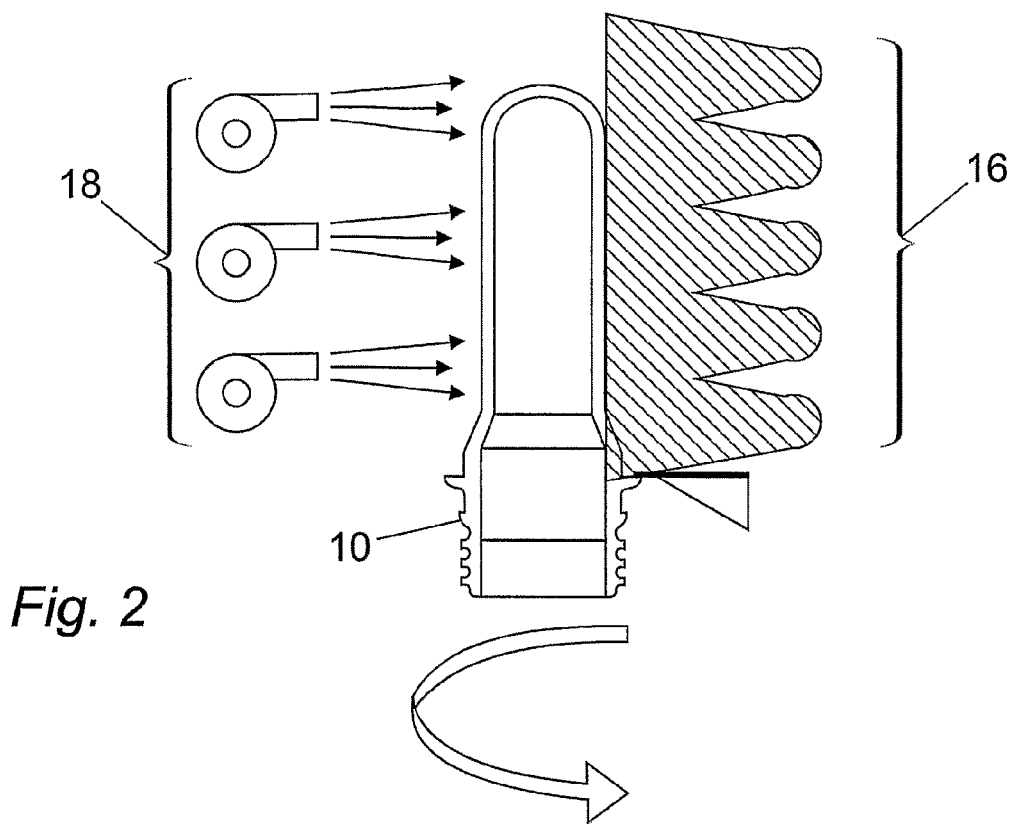
FIG. 2 is a diagrammatic cross-section of view of the heating of a cold preform.

In the heating station (14), the plurality of in-line cold preforms (10) are heated using any suitable heating regime known in the art. FIG. 2 shows, by way of example only, the use of a number of heaters such as infrared lamps (16) on one longitudinal side of a cold preform (10), whilst providing one or more coolers such as fans (18) on the other side of the cold preform (10). During the heating, the preforms are commonly rotated, so as to ensure evenness of the temperature regime applied.

Generally, it is desired to provide a temperature gradient across the thickness of a cold preform that is intended to be subsequently blow moulded, commonly with a higher internal temperature than external temperature. Thus, the known use of infrared lamps (16) to heat the inside of the cold preform (10) and the use of fans (18) to then reduce the temperature of the outside of the preform (10).

Figure 3:
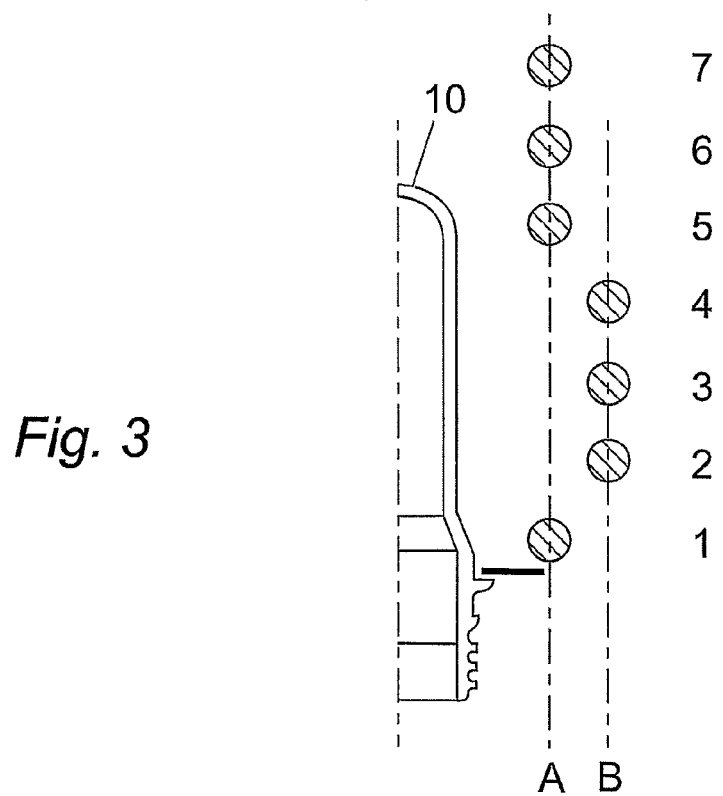
FIG. 3 is a schematic view of the position of a number of infrared lamps for heating a cold preform.

FIG. 3 shows the possible location of, for example, seven infrared lamps (1-7). The seven infrared lamps (1-7) in FIG. 3 are evenly spaced longitudinally or vertically, but differently spaced transversely along lines A and B from the cold preform (10). FIG. 3 shows this array of seven infrared lamps by way of example only, and any vertical and/or transverse positioning or arrangement of the infrared lamps and/or the fans (18) may be usable in the heating of cold preforms (10). The use and intensity of each infrared lamp, and optionally also each fan (18), is discussed hereinafter in relation to FIG. 5.

Returning to FIG. 1, after passage through the heating station (14), there is provided a plurality of in-line heated preforms (22). The in-line heated preforms (22) can then be conveyed or transported to one, usually a series, of stretch blow moulds. FIG. 1 shows, by way of example only, a stretch blow mould (24) comprising two half portions, (24a, 24b). As is known in the art, the hot preform (22) is located in the neck of the stretch blow mould (24), a stretch rod (not shown) is applied to stretch the hot preform downwardly into the mould space (26), a pre-blow is applied to blow the hot preform (22) to fit the mould, and then a final blow is applied at a higher pressure to ensure full fitting of the preform to the design of the mould (24). Once the blow moulded product is fully formed in the mould (24), the two mould portions (24a, 24b) are separated to provide the final blow moulded product (12).

As mentioned above, variation in the cold preforms (10) supplied to the process, and/or in any one of a number of the process parameters or conditions, including ambient temperature, can ultimately create a blow moulded product with undesired dimensions, in particular uneven wall thickness (es). Commercial bottle users are often requesting reduced wall thicknesses of the plastic bottles for various reasons, whilst requiring maintenance of bottle properties such as strength, stiffness and barrier. The properties of plastic bottles, etc, are therefore becoming more demanding, making any allowable variances in tolerances tighter or smaller, and full quality control more important.

U.S. Pat. No. 3,865,912 describes a blow-moulding method using a heating chamber for receiving a thermoplastic slug, and measuring the radiation intensity of the infrared radiators used by a bolometer in the heating chamber. However, there can still be significant variation of the temperature of a hot preform after its heating and before it reaches a stretch blow mould, for example due to ambient temperature variation.

FIG. 1 show part of a method for providing an internal surface temperature profile of a thermoplastic preform during a stretch blow moulding production process, wherein at least one of the in-line heated preforms (22) is diverted by a diverting means to provide at least one off-line heated preform (30). The term 'off-line' is used herein to relate to the separation of such a heated preform(s) from the remainder of the in-line heated preforms (22), which in-line heated preforms (22) are subsequently provided to one or more stretch blow moulds (24) for forming the heated preforms into blow moulded products (12) as described above.

The diverting means able to provide the at least one off-line heated preform (30) may be any suitable apparatus, unit, device or assembly, able to select an in-line heated preform (22) and move it to an off-line situation or location. Diverting means can include one or more rods, grippers, switch mechanisms or rails or the like known in the art, and is not further discussed herein.

The selection of at least one in-line heated preform (22) to be diverted to provide at least one off-line heated preform (30) may be automatic, manual or a combination of same. The selection may occur at a predetermined time interval, such as every hour, and/or may be randomly selected. Additionally and/or alternatively, selection may occur at the demand of an operator.

The timing and number of in-line heated preforms (22) to be diverted may be based on any selection decision or criteria. One non-limiting example is the diverting of one in-line heated preform (22) every hour of the production process. The timing and number of diverted in-line heated preforms (22) may also be related to the information provided by internal surface temperature profiles of previously tested off-line heated preforms (30). For example, there may be times or situations where more off-line heated preforms are desired to maintain closer inspection of the production process, for example during start up and/or inspection of a production process.

By being off-line, the off-line heated preform (30) can then be assessed without the time and/or space limitations of attempting to assess a hot preform whist in-line. It is a particular advantage of the present invention that this allows a greater and/or more accurate assessment of at least the inside temperature profile of the off-line heated preform (30) than is possible with any in-line measurement system.

Figure 4:
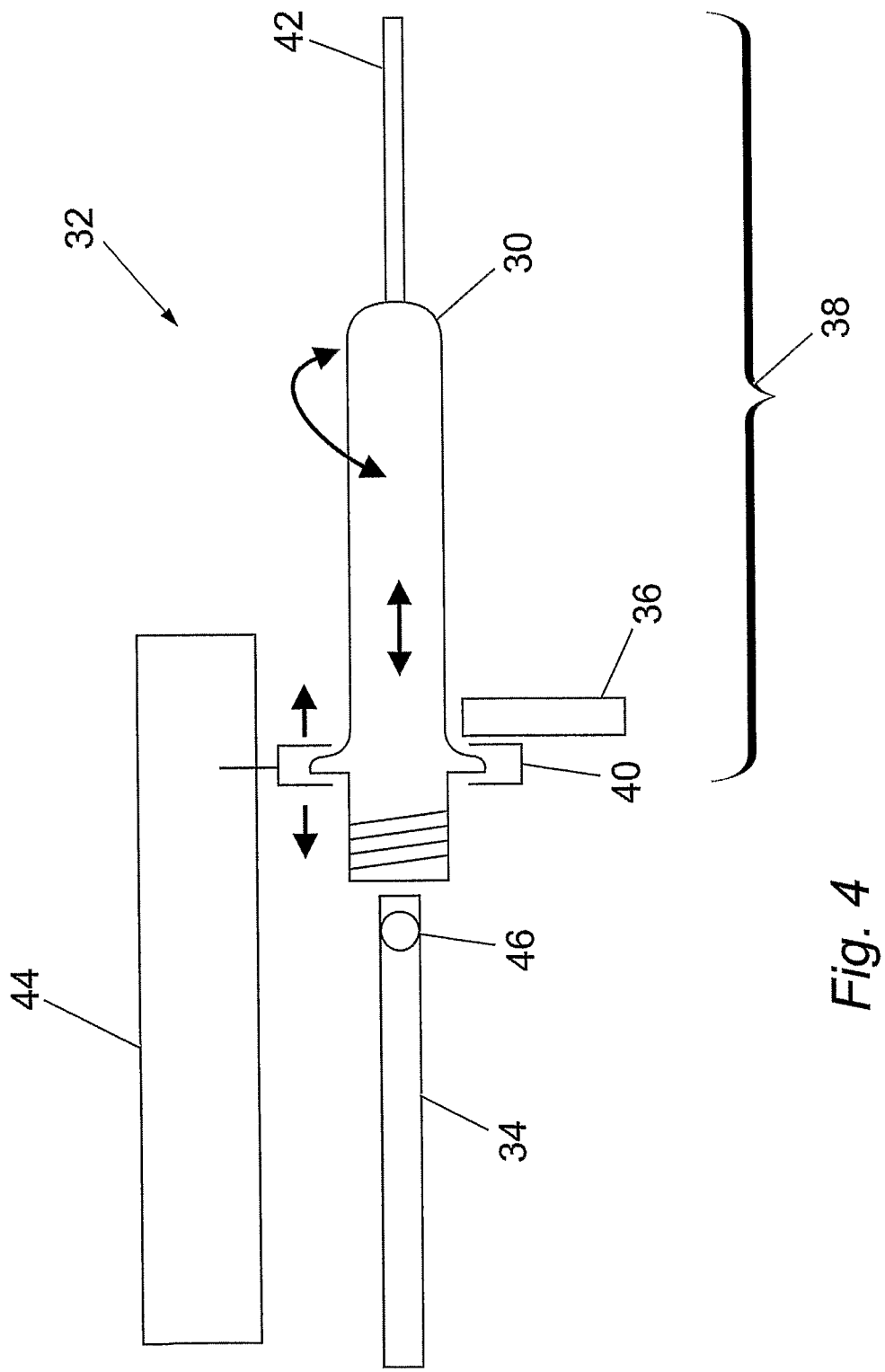
FIG. 4 is a diagrammatic view of a first rig for obtaining an inside surface temperature profile of a preform.

FIG. 4 shows a first test rig (32) for an off-line heated preform (30). The first test rig (32) comprises a first temperature sensor (34), preferably an infrared temperature sensor, a second temperature sensor (36), preferably also an infrared temperature sensor, and a slide assembly (38) comprising a clamp (40) to clamp the off-line heated preform (30), and a rail (42) along which the clamp (40) is movable to provide displacement of the off-line heated preform (30) relative to the first and second temperature sensors (34, 36). The test rig (32) includes a displacement monitor (44) to measure the movement of the clamp (40) and/or off-line heated preform (30) so as to be able to provide displacement data relative to the temperature measurements made by the first and second temperature sensors (34, 36).

The temperature sensors (34, 36) may be any suitable temperature sensors, preferably not being snap shot action cameras, able to provide temperature readings at least two locations along the measured length of a preform. Preferably, the temperature sensors (34, 36) are 'low cost', and they can be self-powered miniature infrared non-contact thermocouples (also known in the art as 'thermopiles'). There is a wide range of suitable temperature sensors suitable for use by the present invention because temperature measurements on the off-line heated preform (30) can be achieved without time pressure or limitation. Infrared temperature sensors are well known in the art.

The term temperature sensor as used herein may also comprise just the tip or head of a sensor supported on a support. Such supports may be able to support more than of such one temperature sensors thereon, for example at different angles around the support and/or spacing along the length of a support. Thus, a single support passing inside a preform may comprise two or more sensors able to provide separate temperature measurements for an internal temperature circumferential, length, or combination profile once the support is positioned therein.

At least the first temperature sensor (34) fits inside the off-line heated preform (30). The first temperature sensor (34) may have a frontal temperature view or a side temperature view (46) (or views, where there is more than one sensor on a support) from at or near its preform-interior end. Accuracy of temperature measurements on the off-line heated preform (30) can be achieved without time pressure or limitation.

In use, the off-line heated preform (30) is located with the clamps (40), and moved along the rail (42) so as the first temperature sensor (34) passes into the inside of the off-line heated preform (30). Thus, the first temperature sensor (34) can detect the inside surface temperature of the off-line heated preform (30) at least two locations along the longitudinal length of the off-line heated preform (30), so as to provide an inside surface temperature profile of said preform (30).

The second infrared temperature sensor (36) located outside of the off-line heated preform (30) allows the present invention to provide an outside surface temperature profile of said preform (30). The second temperature sensor (36) is able to measure the outside surface temperature at least two locations along the outside length of the off-line heated preform (30) during its longitudinal displacement, which measurements can then provide such an outside surface temperature profile.

Figure 5:
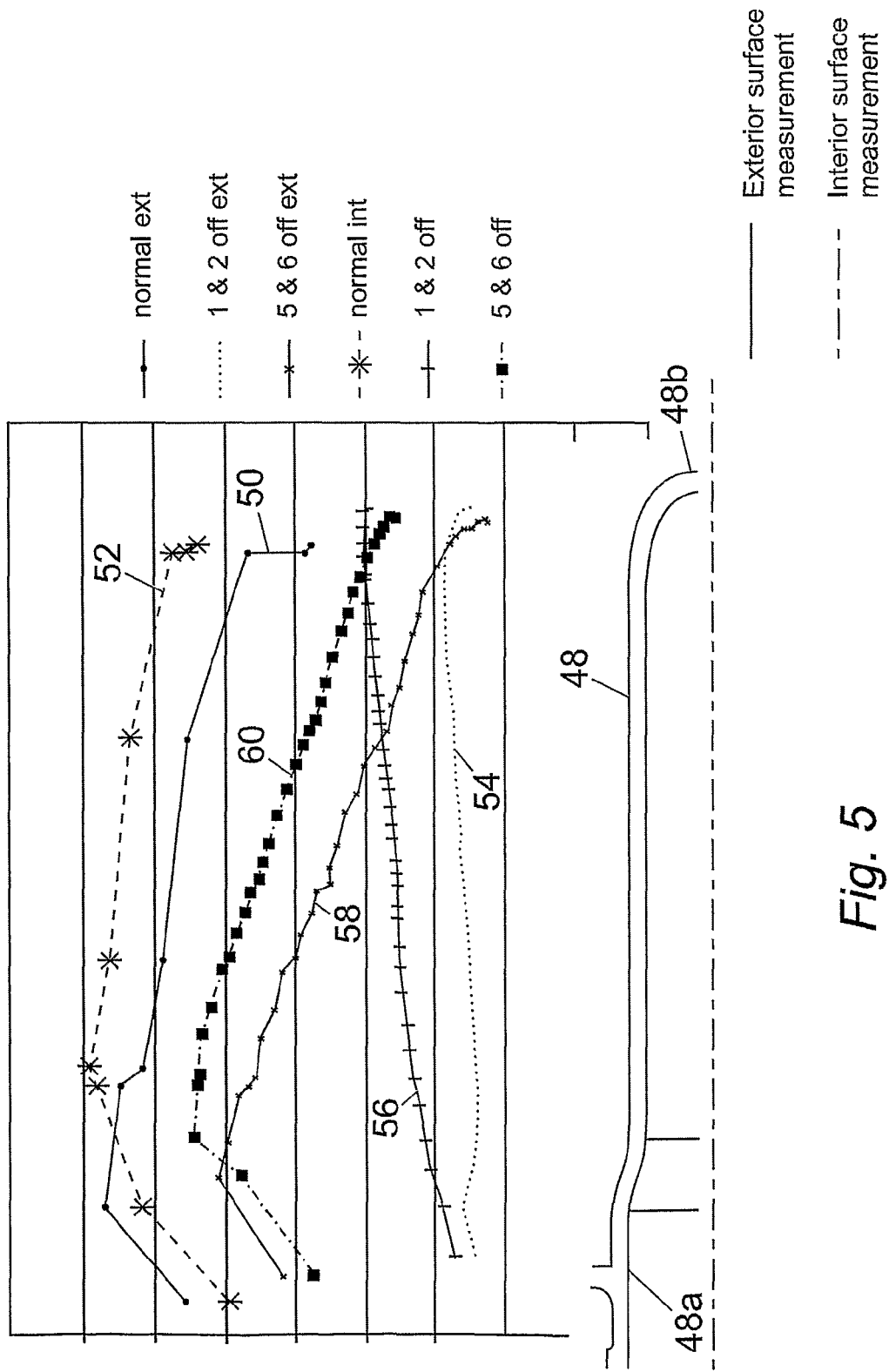
FIG. 5 is a graph of inside and outside surface temperature profiles of different preforms.

FIG. 5 shows three sets of inside and outside surface temperature profiles of three same-dimensioned, but differently heated, heated preforms. The preform shape is shown in half-longitudinal view (48) along the length of the graph of FIG. 5, to directly relate its length to the longitudinal measurements of each temperature profile.

FIG. 5 shows a first line (50) being an outside surface temperature profile of an off-line heated preform (48) in which all the infrared lamps (1-7) shown in FIG. 3 are powered during the heating of the cold preform (10). As can be seen, there is a maximum temperature near the screw-end (48a) of the heated preform (48), which then reduces along the length of the heated preform (48) to the sealed end (48b).

A second line (52) is an inside surface temperature profile of the same-heated preform (48), whose maximum temperature is slightly further along the preform (48) than the outside surface temperature, but whose temperature subsequently is higher along the length of the preform (48) towards its sealed end (48b). This then confirms the desired temperature gradient across the preform wall.

With the outside and inside surface temperature profiles (50, 52) of the preform, there is provided to the process:

(i) a more detailed relationship between the heating station (14) set-up and operation, (such as the power settings, ventilation and preform speeds), and the preform temperature;

(ii) better and quicker information on the effect of different preform material grades on the process set-up. It is well known in the art that, for example, PET is typically supplied from many manufacturers with different heating characteristics and/or IR absorption properties; which properties an operator must take into account during set-up of the SBM production run;

(iii) better and faster understanding of the influence of colour on the SBM process. Different coloured preforms will heat differently due to different infrared heat absorption;

(iv) better and faster assessment of temperature deviating from an initial set-up, with more accuracy and analysis through having detailed measured measurements along the length on both the inside and outside surface profiles; and (v) the ability to make a more detailed and/or comparable decision with regard to the appropriate action to take to correct the inside, and optionally outside, surface temperatures, at any one particular location, region or area along the measured length of a preform, or of the whole temperature profile, of a heated preform. In particular, an operator can determine which location, etc of the preform requires appropriate action.

FIG. 5 shows third and fourth lines (54, 56 respectively) being outside and inside surface temperature profiles respectively of a preform heated using the arrangement shown in FIG. 3, but with lamps 1 and 2 turned off. Thus, there is significantly less heat applied to the part of the preform next to the screw-end (48a), whilst the inside and outside temperatures rise slowly towards the sealed end (48b) of the preform.

FIG. 5 shows fifth and sixth lines (58, 60 respectively) being outside and inside surface temperature profiles respectively of a heated preform in which lamps 5 and 6 shown in FIG. 3 are turned off. Thus, the maximum temperatures of the profiles are at the screw-end (48a) of the preform, but the temperatures drop more dramatically along their length towards the sealed end (48b) of the preform compared to the first and second lines (50, 52).

As well as a longitudinally temperature profile along the length of the off-line heated preform (30), the test rig (32) in FIG. 4 may also be able to rotate partially or fully the preform (30) to provide either an inside circumferential surface temperature profile from the inside temperature view (46) of the first temperature sensor (34), or an outside circumferential temperature profile from the second temperature sensor (36), or both inside and outside circumferential temperature profiles. Further, with both lateral movement of the preform (30) along the rail (42) and rotational movement of the preform (30), a combination of both inside and outside surface temperature profiles can be obtained to provide a 3-dimensional temperature profile of the preform (30).

Figure 6:
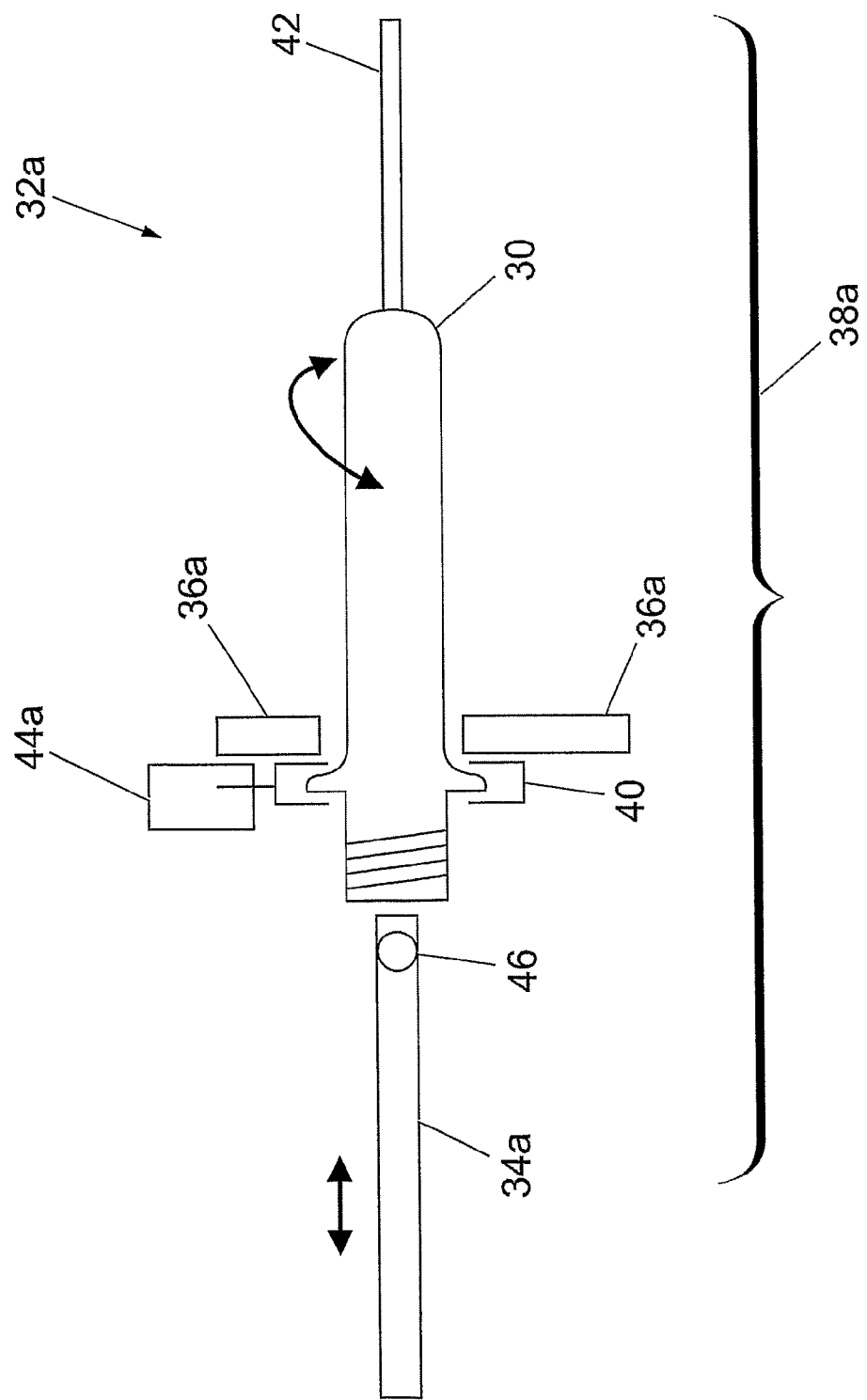
FIG. 6 is a diagrammatic view of a second rig for obtaining an inside surface temperature profile of a preform.

FIG. 6 shows a second test rig (32a) for an off-line heated preform (30). The second test rig (32a) comprises a first temperature sensor (34a), preferably an infrared temperature sensor, and two outside second temperature sensors (36a), preferably also being infrared temperature sensors, a second slide assembly (38a) comprising a clamp (40) to clamp the off-line heated preform (30), a rail (42) to provide displacement of the first and second temperature sensors (34a, 36a), and a displacement monitor (44a) to measure the movement of the first and second temperature sensors (34a, 36a) so as to be able to provide displacement data relative to the temperature measurements made by the first and second temperature sensors (34a, 36a).

FIG. 6 particularly shows movement of the first and second temperature sensors (34a, 36a), in contrast to movement of the preform (30) shown in FIG. 4. FIG. 6 also shows the use of a plurality of temperature sensors around the outside circumference of the preform (30) to obtain a plurality of circumferential temperature measurements, from which an outside circumferential temperature profile can preferably be obtained. The use of a number of circumferential located temperature sensors may reduce, minimise or avoid any requirement for rotation of the preform (30) in order still to obtain a circumferential temperature profile.

The use of a plurality of circumferential temperature sensors, and/or rotation of the preform (30), is particularly useful in the analysis of non-regular or non-uniform heated preforms$_{[YS1]}$, intended to provide non-regular or non-uniform shaped bottles. There are many plastic bottles having a non-regular 3-dimensional shape, for which is required a non-regular heated preform. Such preforms require greater control and quality assessment of their heating prior to their stretch blow-moulding, which quality assessment can be provided by the present invention being able to provide a 3-dimension temperature profile, both of outside surface temperature, inside surface temperature, and by comparison, wall-gradient temperature profile also, for regular or non-regular heated preforms.

The operator is able to vary the position and intensity of any one of, any number of, or all of the infrared lamps and/or cooling fans shown in FIGS. 2 and 3, so as to seek inside and outside surface temperature profiles that provide the intended blow moulded product dimensions and other parameters.

The operator can also more accurately determine any variation in the inside and outside surface temperature profiles of an off-line heated preform, compared with that expected or desired, and from such information, more accurately determine how the or each temperature profile is being varied. For example, a single or small dramatic temperature change in a temperature profile may indicate the inefficiency and/or inaction of one or more infrared lamps and/or cooling fans, whilst a complete shift of a temperature profile upwardly or downwardly may indicate a significant influence of ambient temperature across the whole length of the preform.

With any variation in inside, and optionally outside, surface temperature profiles, the process is able to feedback control information and/or instructions to one or more parts of the production process, in particular the heating regime in the heating station (14), but also to other operations such as production speed and/or other process timings. Such feedback and/or control may be automatic, manual, or a combination of same. Such quality control operations may include one or more alarms for the operator.

The inside and/or outside surface temperature profile of an off-line heated preform may provide direct or indirect surface temperature correlation with the or each in-line heated preform. The relationship between the measured inside and/or outside surface temperature profiles of an off-line heated preform with an in-line heated preform can be easily determined as part of any production process, and usually also in relationship to assessment of the dimensions and/or qualities of the final blow moulded product.

In this way, the present invention can provide a method of assessing the internal surface temperature profile of a plurality of preforms in a stretch blow moulding production process by using the inside surface temperature profile of one or more off-line heated preforms to assess the inside surface temperature profile of at least some of the remaining in-line heated preforms which subsequently pass to one or more stretch blow moulds.

In this way, the present invention can also provide a stretch blow moulding process using embodiments described above, preferably being able to provide a quality control of the production process thereby.

In this way, the present invention can further provide apparatus for a stretch blow moulding production process having a heating station, diverting means, one or more stretch blow moulds and at least one infrared temperature sensor as described above.

It is an advantage of the present invention that by providing an inside surface temperature profile, and preferably additionally an outside surface temperature profile, of a hot preform, which temperature profiles are obtained accurately, there can be better and/or faster monitoring and/or feedback control of the SBM process. Each differently shaped and/or differently dimensioned cold preform, and each differently heated cold preform, provides a different final blow moulded product. The present invention is able to reduce the start-up time required for a new production process with more accurate temperature profile information prior to the blow moulding, as well as provide better continuing production quality assessment by being able to more accurately identify heating differences along the complete inside surface of hot preforms. Such information could also be used to assist with the subsequent production of different cold preforms having similar properties and/or parameters.

It is a further advantage of the present invention that it can be used with existing SBM production apparatus, machinery and processes. It is only required that an in-line hot preform is diverted when requested and/or required, whilst the remaining in-line production continues. Thus, the present invention can be retro-applied or retro-fitted to existing SBM processes and production lines.

A person skilled in the art will readily understand that the present invention may be modified in many ways without departing from the scope of the above-mentioned embodiments.

The invention claimed is:

1. A method for providing an internal surface temperature longitudinal profile measurement of a thermoplastic preform during a stretch blow moulding production process, the method comprising:
   (a) heating a plurality of in-line cold preforms in a production process to provide a plurality of in-line heated preforms;
   (b) diverting at least one in-line heated preform of the plurality of in-line heated preforms to provide at least one off-line heated preform;
   (c) providing the remaining in-line heated preforms to one or more stretch blow moulds for forming the remaining in-line heated preforms into blow moulded products; and
   (d) locating one or more temperature sensors inside the at least one off-line heated preform to measure the internal surface temperature longitudinal profile of said at least one off-line heated preform;
   (e) controlling the heating of the plurality of in-line cold preforms based on at least the internal surface temperature longitudinal profile;
   wherein the heating is provided by at least one of a heater and a cooler; and
   wherein the heating comprises controlling at least one of a location and an intensity of at least one of the heater and the cooler based on at least the internal surface temperature longitudinal profile.

2. The method as claimed in claim 1, comprising:
   (a) using the internal surface temperature longitudinal profile to indicate a temperature longitudinal profile of at least one of the plurality of in-line heated preforms.

3. The method as claimed in claim 1, wherein in each cold preform of the plurality of in-line cold preforms has a weight between 10 and 40 gm and a length between 20 and 150 mm.

4. The method as claimed in claim 1, wherein the heating is provided by a plurality of infrared lamps located along one longitudinal side of the plurality of in-line cold preforms.

5. The method as claimed in claim 4, wherein heaters are differently spaced transversely from the plurality of in-line cold preforms.

6. The method as claimed in claim 1, wherein the diverting of at least one the plurality of in-line heated preforms comprises one or more of a group comprising: arms, rods, grippers, switch mechanisms, and rails.

7. The method as claimed in claim 1, wherein the locating comprises at least one of:
   passing one or more temperature sensors into the at least one off-line heated preform; and
   passing the at least one off-line heated preform over one or more temperature sensors.

8. The method as claimed in claim 1, comprising at least one of:
   rotating the at least one off-line heated preform; and
   rotating the one or more temperature sensors.

9. The method as claimed in claim 1, comprising:
   locating one or more outside temperature sensors along an outside of the at least one off-line heated preform to provide an outside surface temperature longitudinal profile of the at least one off-line heated preform.

10. The method as claimed in claim 9, comprising at least one of:
    passing the one or more outside temperature sensors along the outside of the at least one off-line heated preform; and
    passing the at least one off-line heated preform across the one or more outside temperature sensors.

11. The method as claimed in claim 9, wherein the one or more outside temperature sensors provide an outside circumferential temperature profile.

12. The method as claimed in claim 11, wherein an outside circumferential temperature profile and an inside circumferential temperature profile of the at least one off-line heated preform is provided.

13. The method as claimed in claim 8, wherein a 3-dimensional temperature profile of the at least one off-line heated preform is provided.

14. The method as claimed in claim 1, wherein said one or more temperature sensors are an infrared temperature sensor.

15. A method of assessing an internal surface temperature longitudinal profile of a plurality of preforms in a stretch blow moulding production process, the method comprising:
   (a) heating a plurality of in-line cold preforms in a production process to provide a plurality of in-line heated preforms;
   (b) diverting at least one of the plurality of in-line heated preforms to provide at least one off-line heated preform;
   (c) providing the remaining in-line heated preforms to one or more stretch blow moulds for forming the heated preforms into blow moulded products;

(d) locating one or more temperature sensors inside the at least one off-line heated preform to measure the internal surface temperature longitudinal profile of said at least one off-line heated preform; and (e) measuring an internal surface temperature longitudinal profile of at least one of the remaining in-line heated preforms;

(f) controlling the heating of the plurality of in-line cold preforms based on at least the internal surface temperature longitudinal profile;

wherein the heating is provided by at least one of a heater and a cooler; and wherein the heating comprises controlling at least one of a location and an intensity of at least one of the heater and the cooler based on at least the internal surface temperature longitudinal profile.

16. A stretch blow moulding production process comprising:

(a) heating a plurality of in-line cold preforms in a production process to provide a plurality of in-line heated preforms;

(b) diverting at least one of the plurality of in-line heated preforms to provide at least one off-line heated preform;

(c) providing the remaining in-line heated preforms to one or more stretch blow moulds for forming the heated preforms into blow moulded products;

(d) locating one or more temperature sensors inside the at least one off-line heated preform to measure an internal surface temperature longitudinal profile of said at least one off-line heated preform; and (e) providing a quality control of the production process utilizing the internal surface temperature longitudinal profile measurement;

(f) the heating of the plurality of in-line cold preforms based on at least the internal surface temperature longitudinal profile;

wherein the heating is provided by at least one of a heater and a cooler; and wherein the heating comprises controlling at least one of a location and an intensity of at least one of the heater and the cooler based on at least the internal surface temperature longitudinal profile.

17. A stretch blow moulding production process as claimed in claim 16 further comprising at least one of:

(a) heating a plurality of in-line cold preforms in a production process to provide a plurality of in-line heated preforms;

(b) diverting at least one of the plurality of in-line heated preforms to provide at least one off-line heated preform;

(c) providing the remaining in-line heated preforms to one or more stretch blow moulds for forming the heated preforms into blow moulded products;

(d) locating one or more temperature sensors inside the at least one off-line heated preform to measure an internal surface temperature longitudinal profile of said at least one off-line heated preform; and (e) using the internal surface temperature longitudinal profile measurement to indicate a temperature longitudinal profile of at least one of the plurality of in-line heated preforms.

18. An apparatus for a stretch blow moulding production process comprising:

a heating station to heat a plurality of in-line cold preforms to provide a plurality of in-line heated preforms;

diverting means to divert at least one of the plurality of in-line heated preforms to provide at least one off-line heated preform;

one or more stretch blow moulds for receiving the remaining in-line heated preforms of the plurality of in-line heated preforms and forming the in-line heated preforms into blow moulded products; and one or more temperature sensors located inside the at least one off-line heated preform to provide an internal surface temperature longitudinal profile measurement of said at least one off-line heated preform;

wherein heating of the plurality of in-line cold preforms is based on at least the internal surface temperature longitudinal profile;

wherein the heating is provided by at least one of a heater and a cooler; and wherein the heating comprises controlling at least one of a location and an intensity of at least one of the heater and the cooler based on at least the internal surface temperature longitudinal profile.

* * * * *